United States Patent
Yamada

(10) Patent No.: US 10,644,568 B2
(45) Date of Patent: May 5, 2020

(54) STATOR FRAME, STATOR AND ROTARY ELECTRICAL MACHINE

(71) Applicant: FANUC CORPORATION, Yamanashi (JP)

(72) Inventor: Yasuo Yamada, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/147,599

(22) Filed: Sep. 29, 2018

(65) Prior Publication Data

US 2019/0115804 A1  Apr. 18, 2019

(30) Foreign Application Priority Data

Oct. 13, 2017 (JP) ................. 2017-199430

(51) Int. Cl.
*H02K 5/20* (2006.01)
*H02K 9/19* (2006.01)
*H02K 9/00* (2006.01)
*H02K 3/24* (2006.01)
*H02K 1/16* (2006.01)

(52) U.S. Cl.
CPC ............ *H02K 9/005* (2013.01); *H02K 3/24* (2013.01); *H02K 5/20* (2013.01); *H02K 1/16* (2013.01); *H02K 9/19* (2013.01)

(58) Field of Classification Search
CPC .......... H02K 9/005; H02K 9/19; H02K 9/193; H02K 9/197; H02K 9/20; H02K 3/24; H02K 5/20; H02K 1/16; H02K 1/20
USPC ..................................... 310/52–65
See application file for complete search history.

(56) References Cited

U.S. PATENT DOCUMENTS

2014/0241865 A1* 8/2014 Arimatsu ............... F01D 25/12
                                                         415/180
2019/0305615 A1* 10/2019 Yamada ................ H02K 5/20

FOREIGN PATENT DOCUMENTS

| CN | 101944799 A | 1/2011 | |
|---|---|---|---|
| JP | 2011-015578 A | 1/2011 | |
| JP | 2011015578 A * | 1/2011 | ............... H02K 1/20 |
| JP | 2014-166067 A | 9/2014 | |
| JP | 2015-133807 A | 7/2015 | |
| JP | 2015133807 A * | 7/2015 | |
| JP | 2015-178167 A | 10/2015 | |

(Continued)

OTHER PUBLICATIONS

Machine translation of JP-2015133807-A. (Year: 2015).*

(Continued)

*Primary Examiner* — Michael Andrews
(74) *Attorney, Agent, or Firm* — Studebaker & Brackett PC

(57) ABSTRACT

The stator frame includes: a spiral groove which is provided as a flow path of a coolant from one end side to the other end side in an axis direction spirally along the circumferential direction of an outer circumferential surface; and annular grooves which individually communicate with the end portions of the spiral groove on the one end side and the other end side in the axis direction and which are provided annularly along the circumferential direction of the outer circumferential surface. The spiral groove is formed such that a groove depth is shallow in regions on the one end side and the other end side in the axis direction and the groove depth is deep in a region around a center in the axis direction.

5 Claims, 12 Drawing Sheets

(56) References Cited

FOREIGN PATENT DOCUMENTS

JP          2015-211562 A     11/2015
WO          2014/199516 A1    12/2014

OTHER PUBLICATIONS

Machine translation of JP-2011015578-A (Year: 2011).*
An Office Action; "Notice of Reasons for Refusal," issued by the Japanese Patent Office dated Jun. 11, 2019, which corresponds to Japanese Patent Application No. 2017-199430 and is related to U.S. Appl. No. 16/147,599; with English language translation.
An Office Action mailed by the State Intellectual Property Office of the People's Republic of China dated Jan. 17, 2020, which corresponds to Chinese Patent Application No. 201811150854.2 and is related to U.S. Appl. No. 16/147,599 with English language translation.

* cited by examiner

FIG. 4
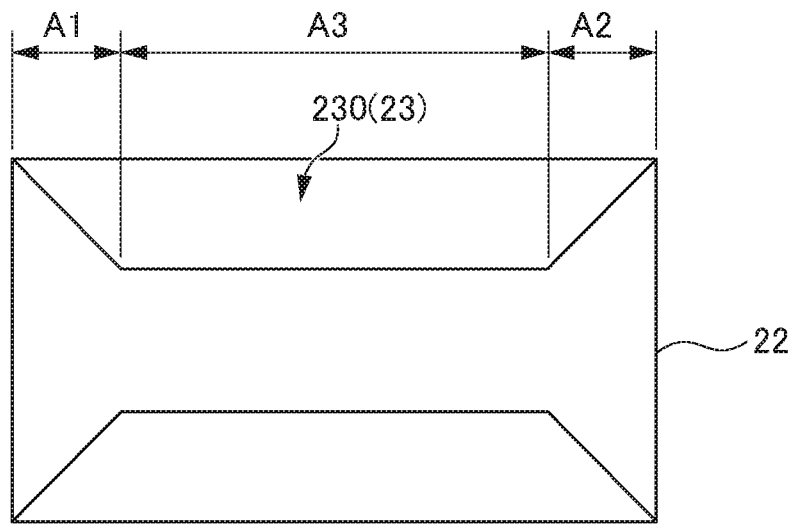
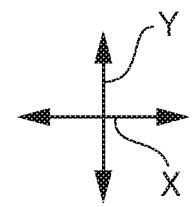

STATOR FRAME, STATOR AND ROTARY ELECTRICAL MACHINE

This application is based on and claims the benefit of priority from Japanese Patent Application No. 2017-199430, filed on 13 Oct. 2017, the content of which is incorporated herein by reference.

BACKGROUND OF THE INVENTION

Field of the Invention

The present invention relates to a stator frame, a stator and a rotary electrical machine.

Related Art

In a rotary electrical machine such as a motor including a rotor and a stator, the stator is formed with: an iron core on which a winding is arranged; and a stator frame which is fitted to the outer circumferential surface thereof. When the rotary electrical machine is driven, the stator and the like generate heat due to a heat loss such as an iron loss. Hence, in order to cool the stator, a structure is adopted where a flow path along which a coolant is circulated is provided between the stator frame and a housing that is fitted to the outer side thereof (see, for example, patent document 1).

Patent Document 1: Japanese Unexamined Patent Application, Publication No. 2011-15578

SUMMARY OF THE INVENTION

In the stator of patent document 1 described above, in the outer circumferential surface of the stator frame, a spiral groove is provided. The substantially cylindrical housing is fitted to the outer side of the stator frame, and thus an opening part of the groove provided in the outer circumferential surface of the stator frame is blocked by the inner circumferential surface of the housing. In this way, between the outer circumferential surface of the stator (the stator frame) and the inner circumferential surface of the housing, the flow path along which the coolant can be circulated is formed. In the stator frame described above, it is required that the amount of coolant circuited be increased, and that thus the efficiency of cooling of the stator be more enhanced.

An object of the present invention is to provide a stator frame in which the efficiency of cooling of a stator is excellent, a stator and a rotary electrical machine.

(1) The present invention relates to a substantially cylindrical stator frame (for example, a stator frame 22 which will be described later) which has a function of cooling a stator in a rotary electrical machine, which includes: a spiral groove (for example, a spiral groove 230 which will be described later) which is provided as a flow path (for example, a flow path 23 which will be described later) of a coolant from one end side to the other end side in an axis direction spirally along the circumferential direction of an outer circumferential surface; and annular grooves (for example, annular grooves 240 which will be described later) which individually communicate with the end portions of the spiral groove on the one end side and the other end side in the axis direction and which are provided annularly along the circumferential direction of the outer circumferential surface and in which the spiral groove is formed such that a groove depth is shallow in regions on the one end side and the other end side in the axis direction and that the groove depth is deep in a region around a center in the axis direction.

(2) In the stator frame of (1), groove projections (for example, groove projection 231 which will be described later) on the outer sides of the spiral groove located at both end portions in the axis direction include tapered portions (for example, tapered portion 232 which will be described later) whose diameters are reduced toward the annular grooves.

(3) In the stator frame of (1) or (2), the spiral groove may be any on of a groove of one thread and a groove of multiple threads.

(4) The present invention relates to a stator (for example, a stator 20 which will be described later) that includes: the stator frame according to any one of (1) to (3); and a substantially cylindrical iron core (for example, an iron core 21 which will be described later) which is provided on the inner circumferential side of the stator frame.

(5) The present invention relates to a rotary electrical machine (for example, a motor 1 which will be described later) that includes: the stator according to (4); and a rotor (for example, a rotor 30 which will be described later) which is supported with a rotary axis (for example, a rotary axis 32 which will be described later) and which is provided on the inner circumferential side of the stator.

According to the present invention, it is possible to provide a stator frame in which the efficiency of cooling of a stator is excellent, a stator and a rotary electrical machine.

BRIEF DESCRIPTION OF THE DRAWINGS

FIG. 4 is a conceptual view showing the distribution of groove depths of the spiral groove 230 formed in the outer circumferential surface of the stator frame 22;

DETAILED DESCRIPTION OF THE INVENTION

Figure 1:
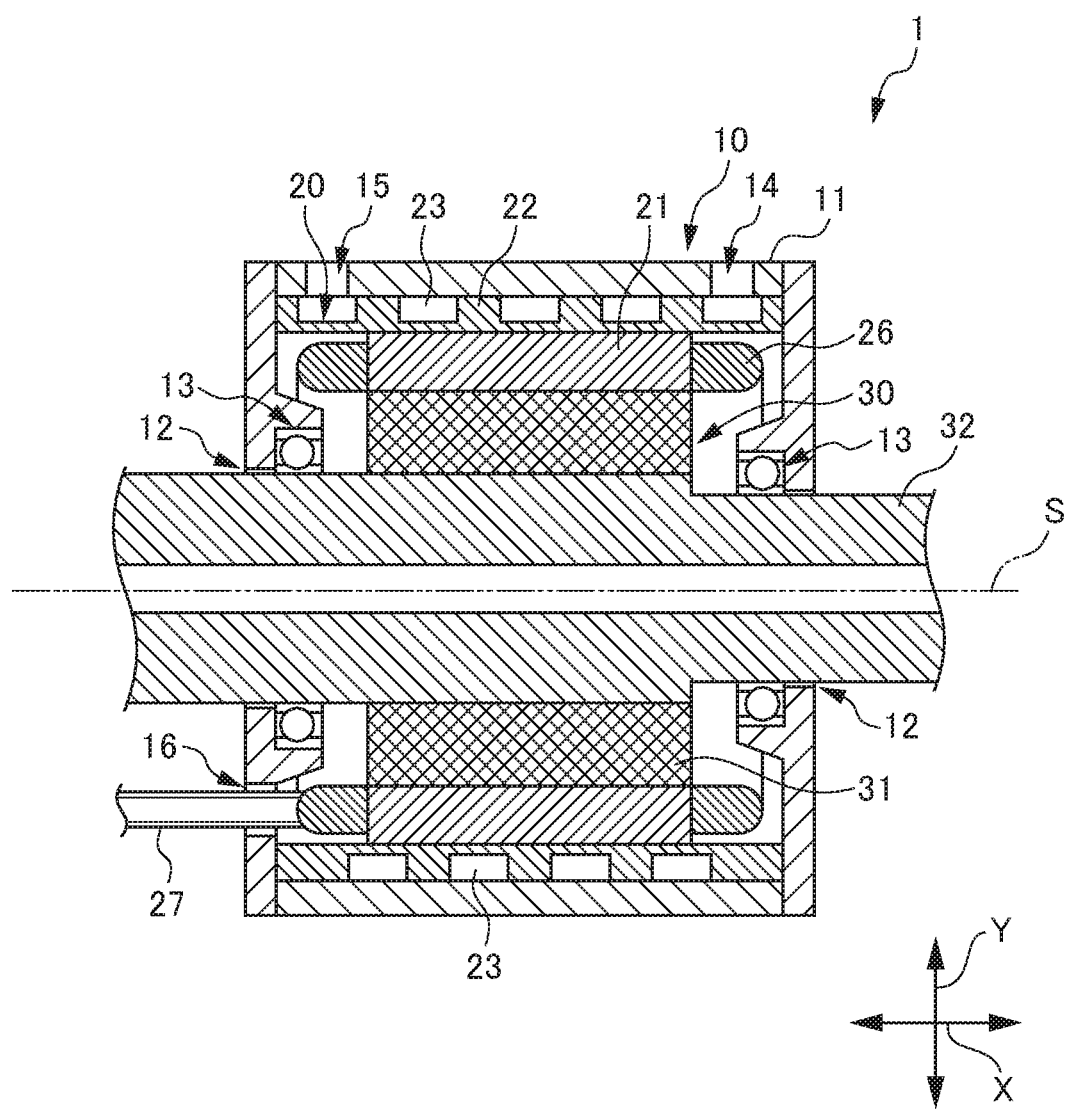
FIG. 1 is a cross-sectional view illustrating the configuration of a motor 1 in an embodiment.

An embodiment of the present invention will be described below. Drawings attached to the present specification each are schematic views, and with consideration given to ease of understanding and the like, the shapes, the scales, the vertical and horizontal dimensional ratios and the like of individual portions are changed or exaggerated from the real things. In the drawings, hatching which indicates the cross sections of members and the like is omitted as necessary.

In the present specification and the like, terms which specify shapes, geometric conditions and the extents thereof, for example, terms such as "parallel", "orthogonal" and "directions" include not only the exact meanings of the terms but also the range of the extent to which they are regarded as being substantially parallel, substantially orthogonal and the range of the extent to which they are regarded as being substantially the same directions. A line serving as the rotation center of a rotary axis 32 which will be described later is referred to as a "rotary axis line S", and a direction along the rotary axis line S is also referred to as an "axis direction".

In the present embodiment, a coordinate system in which X and Y are orthogonal to each other is shown in drawings such as FIG. 1. In the coordinate system, the axis direction of a motor 1 is assumed to be an X direction, and its radial direction is assumed to be a Y direction. The axis direction and the radial direction of the motor 1 agree with the axis direction and the radial direction of a stator 20, an iron core 21 and a stator frame 22 which will be described later.

The motor 1 which includes the stator frame 22 of the present embodiment and which serves as a rotary electrical machine will first be described. FIG. 1 is a cross-sectional view illustrating the configuration of the motor 1 in the present embodiment. The configuration of the motor 1 shown in FIG. 1 is an example, and as long as a stator frame according to the present invention can be applied, any configuration may be adopted.

As shown in FIG. 1, the motor 1 includes a frame 10, a stator 20, a rotor 30, a rotary axis 32 and bearings 13. The frame 10 is an exterior member of the motor 1, and includes a frame main body 11 and an axis hole 12. The frame main body 11 is an enclosure which surrounds and holds the stator 20. The frame main body 11 holds the rotor 30 through the bearings 13. The frame main body 11 includes a supply port 14, a discharge port 15 and a hole portion 16.

The supply port 14 is an opening for supplying a coolant to a flow path 23 (which will be described later) in the stator frame 22 and is connected to a supply pipe (unillustrated) for the coolant. The discharge port 15 is an opening for discharging the coolant circulated along the flow path 23, and is connected to a discharge pipe (unillustrated) for the coolant. An introduction portion 230a and a discharge portion 230b are not limited to forms in which as shown in FIG. 1, the direction of opening (direction in which the coolant enters and exits) is the radial direction (Y direction) of the stator frame 22. The direction of opening of the introduction portion 230a and the discharge portion 230b may be the axis direction (X direction).

The hole portion 16 is an opening through which a power line 27 drawn from the stator 20 is passed. The axis hole 12 is a hole through which the rotary axis 32 (which will be described later) is passed. The stator 20 is a composite member which forms a rotary magnetic field for rotating the rotor 30. The stator 20 is formed in the shape of a cylinder as a whole, and is fixed within the frame 10. The stator 20 includes the iron core 21 and the stator frame 22.

The iron core 21 is a member inside which a winding 26 can be arranged. The iron core 21 is formed in the shape of a cylinder and is arranged inside the stator 20. In the inside surface of the iron core 21, a plurality of grooves (unillustrated) are formed, and the winding 26 is arranged in the grooves. Parts of the winding 26 are protruded from both end portions of the iron core 21 in the axis direction (X direction) of the iron core 21. For example, the iron core 21 is produced by stacking a plurality of thin plates such as electromagnetic steel plates so as to form a multilayer member and integrating the multilayer member such as by adhesion or crimping. The iron core 21 is securely joined to the stator frame 22 (which will be described later) in order to receive a reaction force generated by the torque of the rotor 30.

The stator frame 22 is a member which holds the iron core 21 thereinside. The stator frame 22 is formed substantially in the shape of a cylinder, and is arranged outside the stator 20. The stator frame 22 includes the flow path 23 in its outer circumferential surface. The flow path 23 is a groove which is formed from one end side to the other end side in the axis direction (X direction) spirally along the circumferential direction of the outer circumferential surface of the stator frame 22. More specifically, the flow path 23 is a spiral groove of one thread or multiple threads formed in the outer circumferential surface of the stator frame 22. In the flow path 23, the coolant (unillustrated) for cooling heat transmitted from the iron core 21 is circulated. The coolant (unillustrated) supplied from the supply port 14 of the frame main body 11 (the frame 10) is circulated within the flow path 23 while being spirally turned around the outer circumferential surface of the stator frame 22 so as to exchange heat, and is thereafter discharged from the discharge port 15 of the frame main body 11 to the outside.

Figure 2:
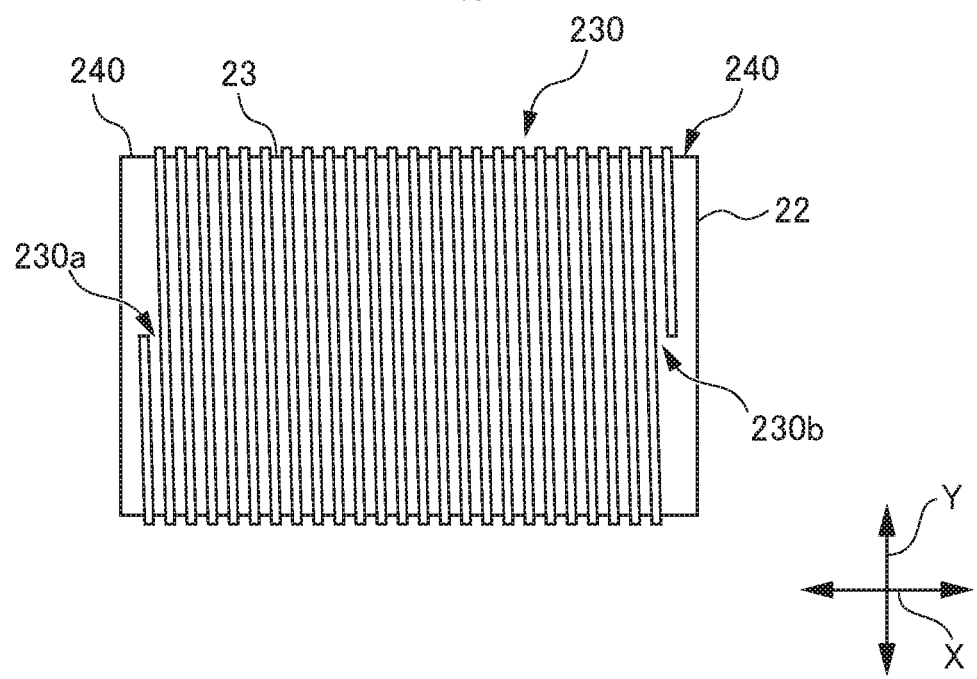
FIG. 2 is a conceptual view when a flow path 23 is formed with a spiral groove 230 of one thread.

Here, the shape of the flow path 23 formed in the stator frame 22 will be described. FIG. 2 is a conceptual view when the flow path 23 is formed with a spiral groove 230 of one thread. As shown in FIG. 2, the flow path 23 of the present embodiment is formed as the spiral groove 230 of one thread in the outer circumferential surface of the stator frame 22. The spiral groove 230 of one thread includes one introduction portion 230a and one discharge portion 230b. In the stator frame 22, in both end portions in the axis direction (X direction), along the circumferential direction of the outer circumferential surface, annular grooves 240 are formed. On the one end side and the other end side in the axis direction, the annular grooves 240 individually communicate with the introduction portion 230a and the discharge portion 230b of the spiral groove 230, and also communicate with the supply port 14 and the discharge port 15 (see FIG. 1) of the coolant.

In the flow path 23 shown in FIG. 2, the coolant (unillustrated) introduced from the annular groove 240 on the one end side in the axis direction (X direction) into the introduction portion 230a is circulated within the flow path 23 spirally along the outer circumferential surface of the stator frame 22, is thereafter passed from the discharge portion 230*b* through the annular groove 240 on the other end side and is discharged to the outside. FIG. 2 is a diagram for illustrating a general form of the flow path 23 which is formed with the spiral groove of one thread, and the shape of the spiral groove 230, the groove depth, the shape of the annular grooves 240 and the like are different from those in the embodiment which will be described later.

The configuration of the motor 1 will be described again with reference to FIG. 1. As shown in FIG. 1, the power line 27 which is electrically connected to the winding 26 is drawn from the iron core 21 of the stator 20. The power line 27 is connected to a power supply device (unillustrated) which is installed outside the motor 1. When the motor 1 is operated, for example, a three-phase alternating current is supplied to the iron core 21 so as to form the rotary magnetic field for rotating the rotor 30. The rotor 30 is a part which is rotated by magnetic interaction with the rotary magnetic field formed by the stator 20. The rotor 30 is provided on the inner circumferential side of the stator 20.

The rotary axis 32 is a member which supports the rotor 30. The rotary axis 32 is inserted so as to pass through the center of the axis of the rotor 30, and is fixed to the rotor 30. A pair of the bearings 13 are fitted to the rotary axis 32. The bearings 13 are members which rotatably support the rotary axis 32, and are provided in the frame main body 11. The rotary axis 32 is supported by the frame main body 11 and the bearings 13 so as to freely rotate about the rotary axis line S. The rotary axis 32 is passed through the axis hole 12 and is connected to, for example, a cutting tool, a power transmission mechanism, a deceleration mechanism or the like (any of which is unillustrated) installed externally.

When in the motor 1 shown in FIG. 1, the three-phase alternating current is supplied to the stator 20 (the iron core 21), a rotary force is generated in the rotor 30 by magnetic interaction between the stator 20 where the rotary magnetic field is formed and the rotor 30, and the rotary force is output through the rotary axis 32 to the outside.

Figure 3:
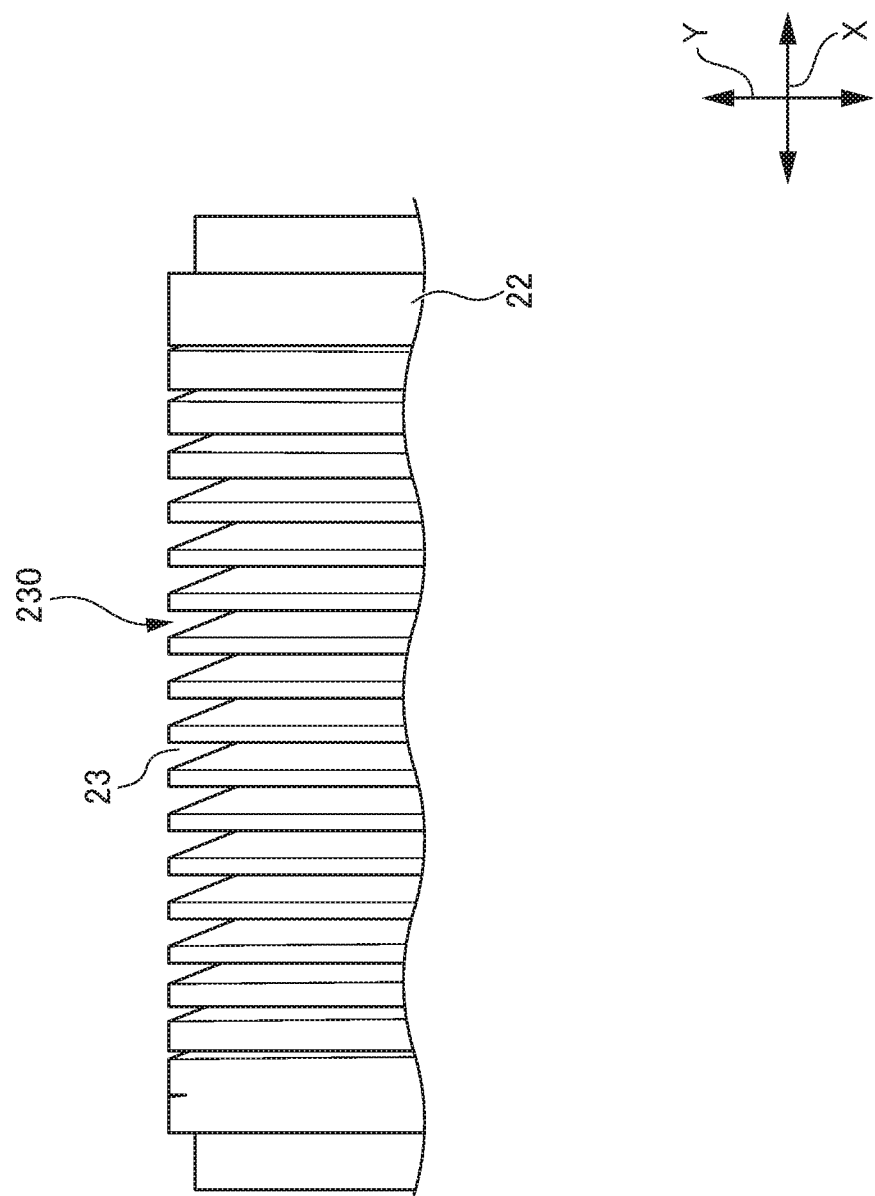
FIG. 3 is a conceptual view showing the shape of the flow path 23 formed in a stator frame 22.
Figure 5A:
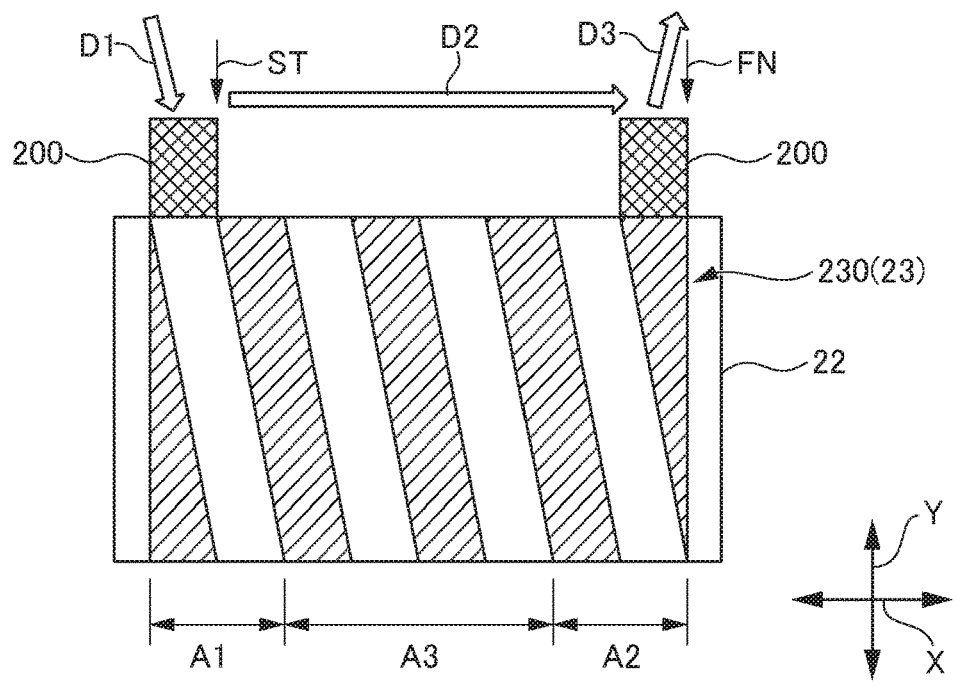
FIG. 5A is a conceptual view showing a method of forming the spiral groove 230 in the embodiment.
Figure 5B:
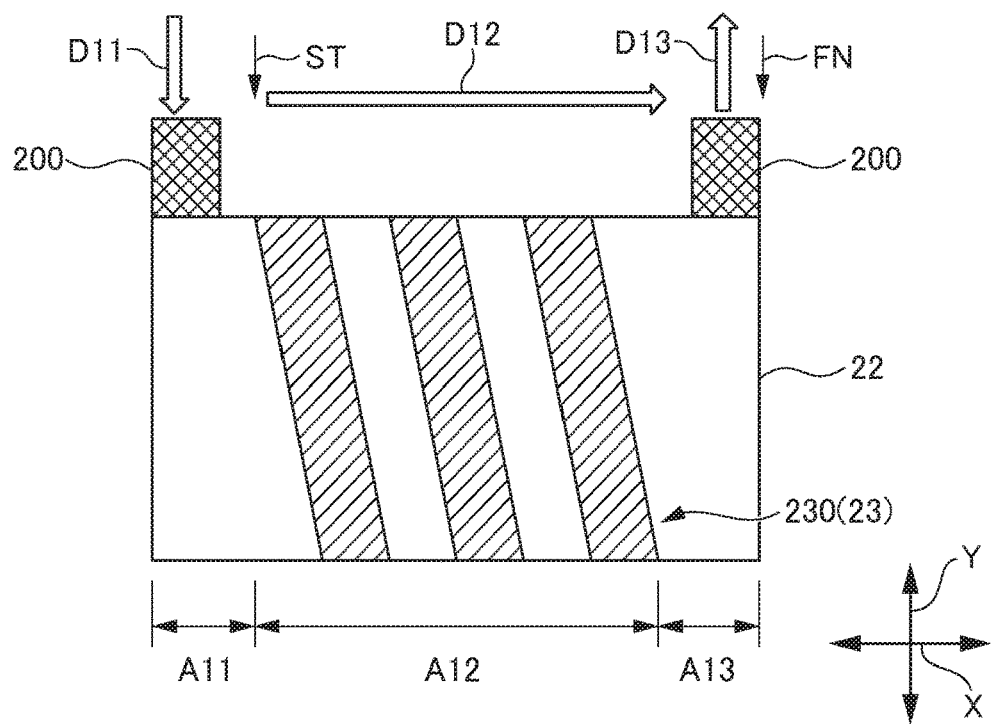
FIG. 5B is a conceptual view showing a method of forming the spiral groove 230 in a conventional example.

The flow path 23 formed in the outer circumferential surface of the stator frame 22 will then be described. FIG. 3 is a conceptual view showing the shape of the flow path 23 formed in the stator frame 22. FIG. 3 shows the shape of part of the flow path 23 formed in the stator frame 22. FIG. 4 is a conceptual view showing the distribution of groove depths of the spiral groove 230 formed in the outer circumferential surface of the stator frame 22. FIG. 5A is a conceptual view showing a method of forming the spiral groove 230 in the present embodiment. FIG. 5B is a conceptual view showing a method of forming the spiral groove 230 in a conventional example.

As shown in FIG. 3, in the outer circumferential surface of the stator frame 22, the flow path 23 is provided from the one end side to the other end side in the axis direction (X direction) along the circumferential direction of the outer circumferential surface. The flow path 23 is formed with the spiral groove 230 of one thread. The spiral groove 230 of the present embodiment has a groove shape of a right triangle whose one side is an inclined surface. FIG. 3 shows a state before, in the stator frame 22, as will be described later, tapered portions 232 (which will be described later) are formed in the spiral groove 230 located at both end portions in the axis direction.

The spiral groove 230 is formed such that as shown in FIG. 4, in a region A1 on the one end side in the axis direction (X direction) and a region A2 on the other end side, the groove depth is shallow whereas in a region A3 around the center in the axis direction, the groove depth is deep.

Specifically, the spiral groove 230 is formed such that as shown in FIG. 4, the groove depth is linearly deeper from the region A1 on the one end side toward the region A3 around the center. Likewise, the spiral groove 230 is formed such that the groove depth is linearly deeper from the region A2 on the other end side toward the region A3 around the center. In the region A3 around the center of the spiral groove 230, the groove depth is constant. The spiral groove 230 is formed such that in the region A3 around the center, the groove depth is deepest.

An example of a method of forming the spiral groove 230 described above will then be described with reference to FIG. 5A. FIG. 5A shows an example where a tool 200 is sequentially moved in the order of the region A1, the region A3 and the region A2 shown in FIG. 4. As shown in FIG. 5A, the tool 200 such as a byte is moved in the axis direction at a feederate (hereinafter also referred to as a "synchronous feedrate") synchronous with the rotation speed of the stator frame 22 while the stator frame 22 is being rotated, and thus it is possible to cut the outer circumferential surface of the stator frame 22. Specifically, the cutting using the tool 200 is started from a starting point ST, and the tool 200 is moved in the region A1 along a path indicated by an arrow D1 such that the groove depth is gradually deeper. In the region A3, the tool 200 is moved along a path indicated by an arrow D2 such that the groove depth is constant. In the region A2, the tool 200 is moved along a path indicated by an arrow D3 such that the groove depth is gradually shallower, and the tool 200 is separated from the stator frame 22 at a completion point FN.

The tool 200 is moved by the procedure described above, and thus the spiral groove 230 having the shape as shown in FIG. 3 can be formed from the one end side to the other end side of the stator frame 22 in the axis direction. By the method of forming the spiral groove 230 according to the method of the present embodiment, the spiral groove 230 can be formed between the region A1 and the region A2.

Here, an example of a method of forming the spiral groove 230 according to a conventional method will be described with reference to FIG. 5B. In FIG. 5B, the order in which the tool 200 is moved is assumed to be the same as in FIG. 5A. In the method of forming the spiral groove 230 according to the conventional method, the spiral groove 230 having a constant groove depth is formed from the one end side to the other end side of the stator frame 22 in the axis direction. In order to form such a spiral groove 230, as shown in FIG. 5B, it is necessary to feed the tool 200 down to a predetermined depth in a direction (Y direction) orthogonal to the axis direction (X direction) and then move the tool 200 from that position along the axis direction.

Specifically, the tool 200 is fed from the one end side of the stator frame 22 in the axis direction along a path indicated by an arrow D11 in the direction orthogonal to the axis direction, and then the tip end of the tool 200 is moved down to the predetermined depth. Then, the cutting using the tool 200 is started from the starting point ST while the tool 200 is being accelerated from that position such that the feedrate of the tool 200 is the synchronous feedrate. On the one end side of the stator frame 22 where the cutting is started, a region (region A11) from the position to which the tool 200 is fed into the stator frame 22 to a position in which the cutting is actually started is a so-called clearance region in which the spiral groove 230 is not formed.

Then, in a region A12, the tool 200 is moved along a path indicated by an arrow D12 while the same groove depth is being maintained. Then, when the cutting approaches the other end side of the stator frame 22 in the axis direction so as to complete the cutting, the feedrate of the tool 200 is gradually reduced, and when the tool 200 is moved up to the completion point FN, the tool 200 is moved along a path indicated by an arrow D13 so as to be separated from the stator frame 22.

The tool 200 is moved by the procedure described above, and thus in the region A12 of the stator frame 22, the spiral groove 230 having the constant groove depth can be formed. On the other end side of the stator frame 22 where the cutting is completed, a region (region A13) from the position in which the cutting using the tool 200 is completed to a position in which the tool 200 is separated from the stator frame 22 is a so-called clearance region in which the spiral groove 230 is not formed. Hence, by the method of forming the spiral groove 230 according to the conventional method, the spiral groove 230 is formed in only the region A12.

Figure 6:
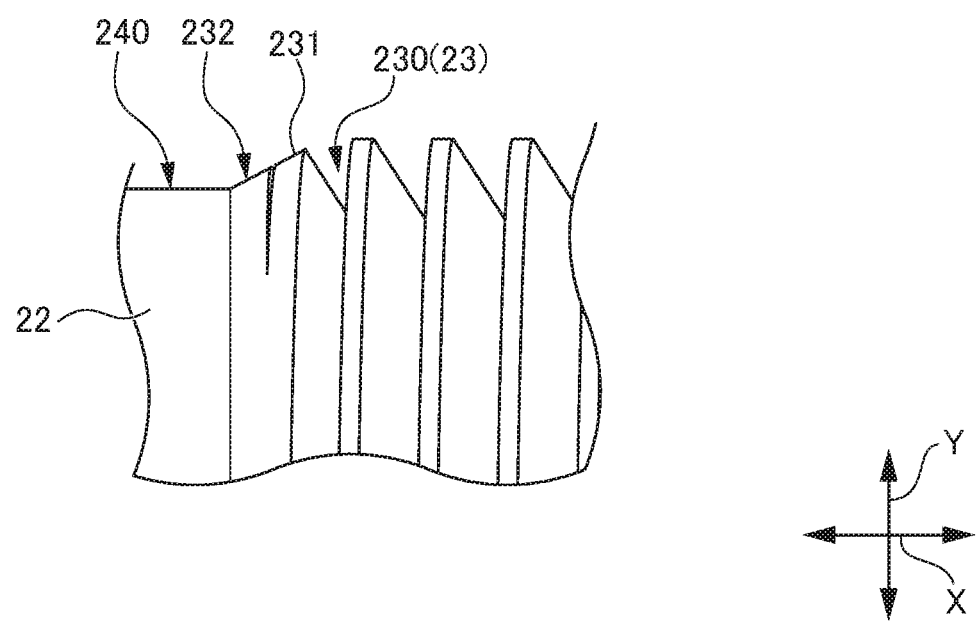
FIG. 6 is a conceptual view showing a tapered portion 232 formed in the spiral groove 230 which is located at an end portion of the stator frame 22 on one end side.

The tapered portions 232 formed at both end portions of the spiral groove 230 will then be described. FIG. 6 is a conceptual view showing the tapered portion 232 formed in the spiral groove 230 which is located in the end portion of the stator frame 22 on the one end side. FIGS. 7A to 7D are conceptual views showing the shape of the tapered portion 232 when the stator frame 22 shown in FIG. 6 is turned one revolution about an axis.

As shown in FIG. 6, the tapered portion 232 is formed in a groove projection 231 on the outer side of the spiral groove 230 located at the end portion on the one end side of the stator frame 22 in the axis direction. The tapered portion 232 is a portion which is inclined such that the diameter thereof is reduced toward the annular grooves 240. Specifically, the tapered portion 232 has such an inclination that the diameter is reduced from a right side to a left side in the axis direction (X direction). Although not shown in the figure, the tapered portion 232 is likewise formed in a groove projection on the outer side of the spiral groove 230 located at the end portion on the other end side of the stator frame 22 in the axis direction. The tapered portion 232 formed in the groove projection on the other end side has such an inclination that the diameter is reduced from the left side to the right side in the axis direction (X direction).

As described previously, the annular groove 240 located at the end portion on the one end side of the stator frame 22 in the axis direction communicates with the supply port 14 and the discharge port 15 (see FIG. 1) in the frame main body 11. Hence, the coolant (unillustrated) supplied from the supply port 14 enters, from the annular groove 240, the tapered portion 232 formed at the end portion on the one end side of the spiral groove 230 and is circulated along the outer circumferential surface of the stator frame 22 within the flow path 23. Then, the coolant is passed from the tapered portion 232 formed at the end portion on the other end side of the spiral groove 230 through the annular groove 240 on the other end side and is discharged toward the discharge port 15.

Figure 7A:
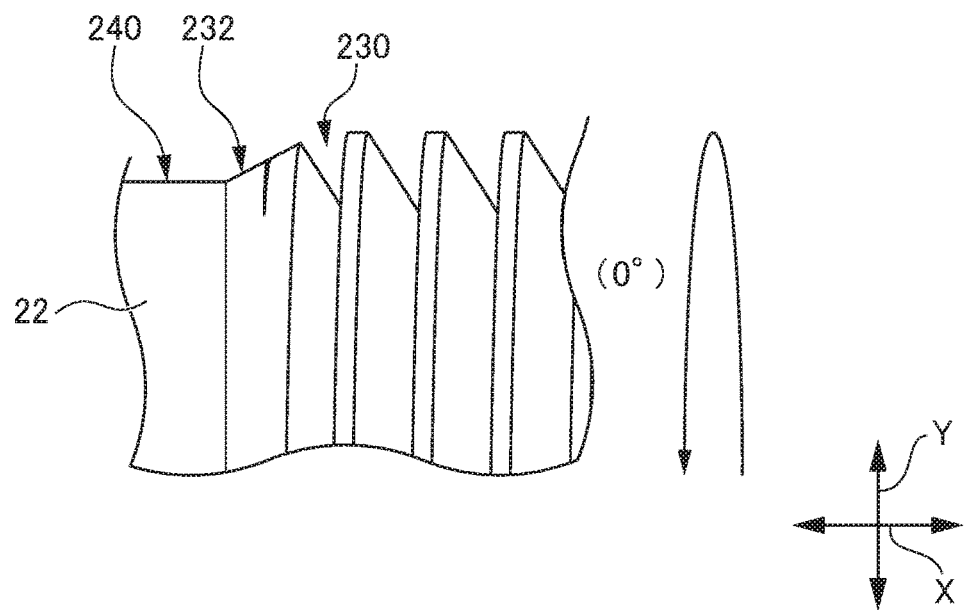
FIG. 7A is a conceptual view showing the shape of the tapered portion 232 when the stator frame 22 is turned one revolution about an axis.
Figure 7B:
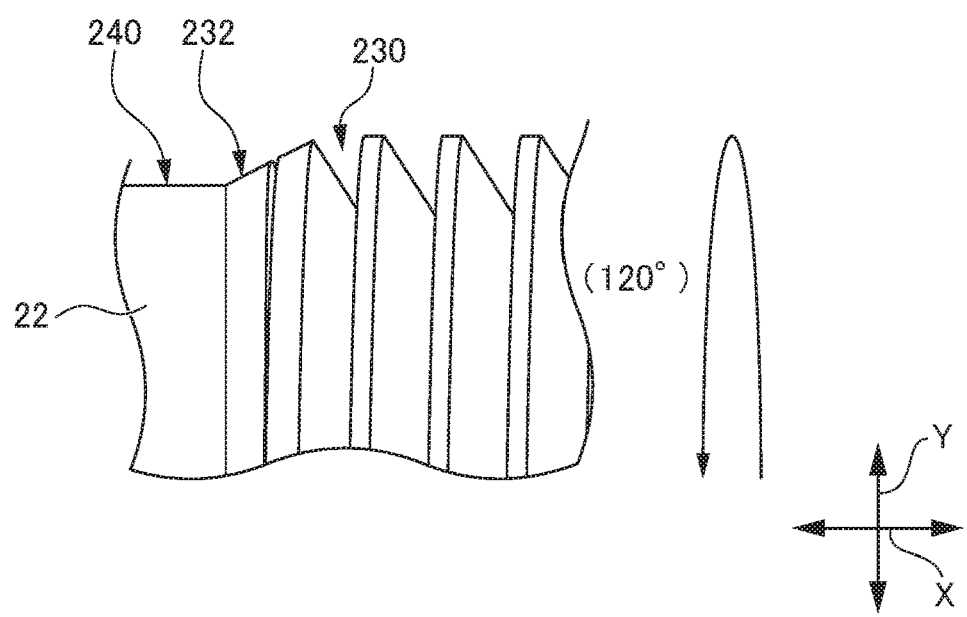
FIG. 7B is a conceptual view showing the shape of the tapered portion 232 when the stator frame 22 is turned one revolution about the axis.
Figure 7C:
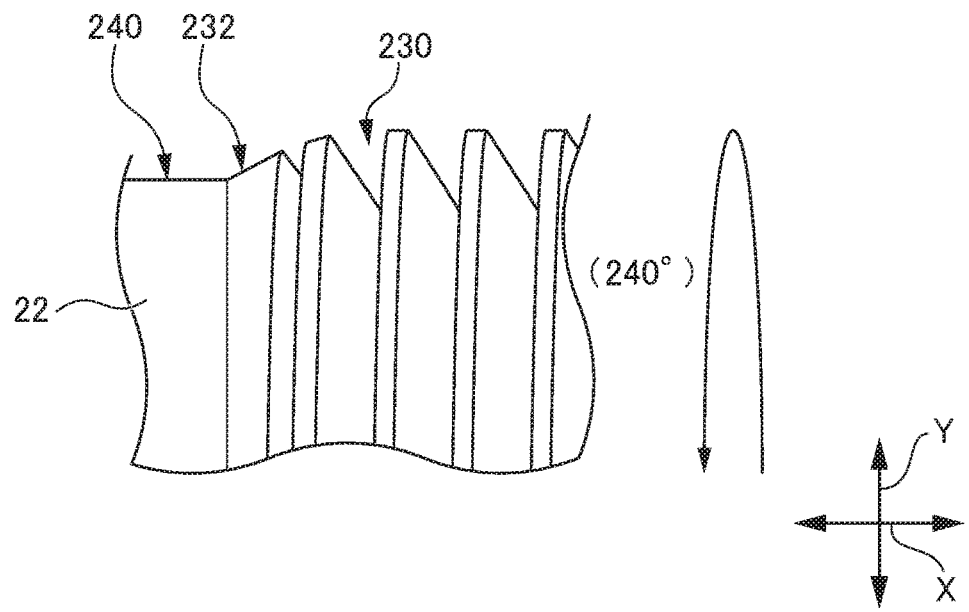
FIG. 7C is a conceptual view showing the shape of the tapered portion 232 when the stator frame 22 is turned one revolution about the axis.
Figure 7D:
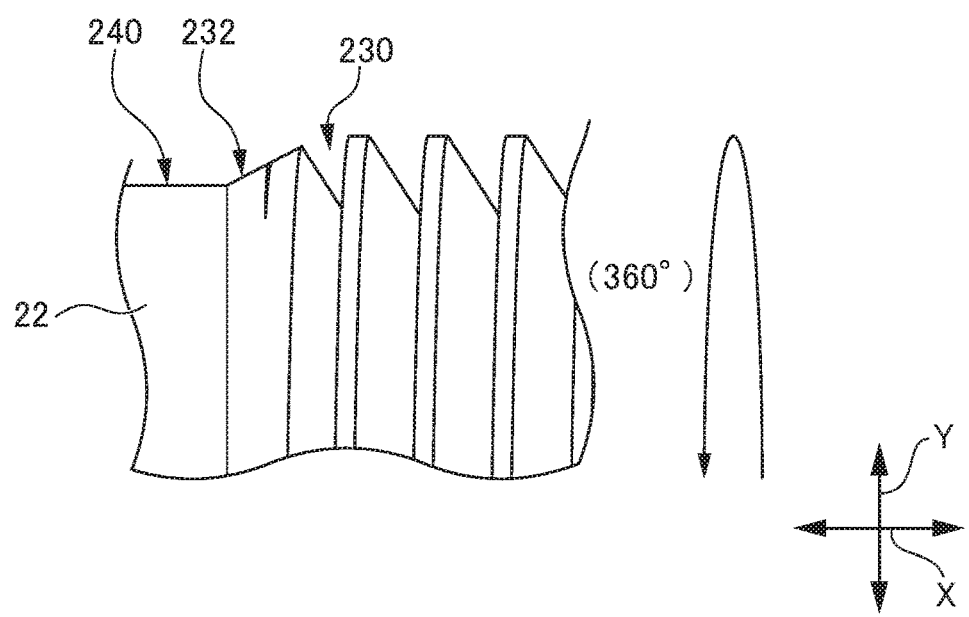
FIG. 7D is a conceptual view showing the shape of the tapered portion 232 when the stator frame 22 is turned one revolution about the axis.

As shown in FIGS. 7A to 7D, the tapered portion 232 is formed along the circumferential direction of the stator frame 22. FIG. 7A shows the tapered portion 232 in the reference position of the stator frame 22. The reference position is a position which is determined for convenience of description. FIG. 7B shows the tapered portion 232 when the stator frame 22 is rotated 120° from the reference position in the direction of an arrow. FIG. 7C shows the tapered portion 232 when the stator frame 22 is rotated 240° from the reference position in the direction of the arrow. FIG. 7D shows the tapered portion 232 when the stator frame 22 is rotated 360° from the reference position in the direction of the arrow (the tapered portion 232 is substantially the same as in FIG. 7A). As shown in FIGS. 7A to 7D, the tapered portion 232 is provided not spirally but annularly along the circumferential direction.

Figure 8:
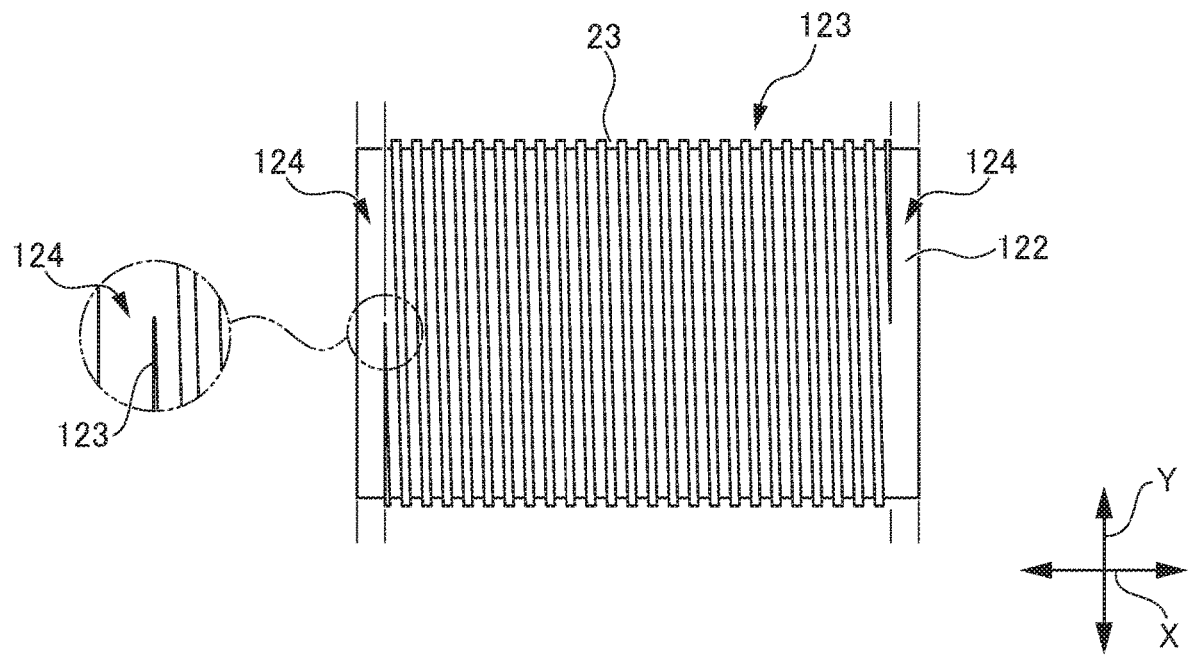
FIG. 8 is a conceptual view of a stator frame 122 in which general annular grooves 124 are formed at both end portions of a spiral groove 123 in an axis direction.

Here, a case where general annular grooves are formed at both end portions of the spiral groove in the axis direction will be described. FIG. 8 is a conceptual view of a stator frame 122 in which the general annular grooves 124 are formed at both end portions of the spiral groove 123 in the axis direction. In FIG. 8, the same parts as in the present embodiment described above are identified with reference numerals whose parts are the same numbers, and repeated description will be omitted as necessary. In the stator frame 122 shown in FIG. 8, the groove depth of the spiral groove 123 is constant from the one end side to the other end side in the axis direction.

As shown in FIG. 8, the conventional general annular grooves 124 have shapes (parallel grooves) parallel to the Y direction orthogonal to the axis direction (X direction) at both end portions on the one end side and the other end side of the stator frame 122. Hence, at an intersection of the annular groove 124 and the spiral groove 123, as shown in a partial enlarged view (two-dot chain line circle) of the one end side, the end portion of the spiral groove 123 is thin and sharp. Hence, when the stator frame 122 is incorporated into the motor or when the motor is moved, the thin end portion of the spiral groove 123 is easily deformed. Although in order to solve this problem, the thin end portion of the spiral groove 123 can be solved such as by milling, the cost is disadvantageously increased. By contrast, since the stator frame 22 of the present embodiment has the tapered portions 232 at the end portions on the one end side and the other end side of the spiral groove 230, as shown in FIGS. 7A to 7D, the end portion of the spiral groove 230 is prevented from being thin, with the result that it is possible to obtain sufficient strength. The end portions on the one end side and the other end side of the spiral groove 230 individually communicate, through the tapered portions 232, with the annular grooves 240 on the respective sides, and thus it is possible to smoothly circulate the coolant into the flow path 23.

In the stator frame 22 of the present embodiment described above, the spiral groove 230 is formed such that the groove depth is shallow in the region A1 on the one end side and the region A2 on the other end side in the axis direction (X direction) and that the groove depth is deep in the region around the center in the axis direction (see FIG. 3 and the like). The spiral groove 230 of such a shape can be formed, as described with reference to FIG. 5A, in a substantially entire region from the one end side to the other end side of the stator frame 22 in the axis direction. Hence, as described with reference to FIG. 5B, as compared with the case where the spiral groove having the constant groove depth is formed from the one end side to the other end side in the axis direction, the range of the flow path 23 in the axis direction can be more extended. Hence, with the stator frame 22 of the present embodiment, it is possible to more enhance the efficiency of cooling of the stator 20.

In particular, the stator frame 22 of the present embodiment is suitable for a flat type motor. The flat type motor refers to a motor in which a ratio between the diameter of the stator frame 22 and the length in the axis direction is equal to or less than about 1:1. In the flat type motor described above, since the length of the stator frame 22 (the stator 20) in the axis direction is short, as shown in FIG. 5B, even by the method of forming the spiral groove 230 according to the conventional method, the range of the flow path 23 in the axis direction cannot be sufficiently secured. However, since in the stator frame 22 of the present embodiment, the range of the flow path 23 in the axis direction can be more extended, even in the flat type motor, it is possible to more enhance the efficiency of cooling of the stator.

The stator frame 22 of the present embodiment includes the tapered portions 232 at the end portions on the one end side and the other end side of the spiral groove 230 (see FIG. 6). Since in this way, the end portions of the spiral groove 230 are prevented from being thin, it is possible to obtain sufficient strength of the spiral groove 230 over the entire region in the axis direction. Hence, even when the stator frame 22 is incorporated into the motor 1 or when the motor 1 is moved, the end portions of the spiral groove 230 are unlikely to be deformed. Since milling or the like does not need to be performed on the end portions of the spiral groove 230, it is possible to reduce an increase in the cost.

Although the embodiment of the present invention is described above, the present invention is not limited to the embodiment described above, various variations and modifications are possible as in variation forms which will be described later and they are also included in the technical scope of the present invention. The effects described in the embodiment are simply a list of most preferred effects produced from the present invention, and there is no limitation to the effects described in the embodiment. Although the embodiment described above and the variation forms which will described later can be used by being combined as necessary, the detailed description thereof will be omitted.

(Variation Forms)

Figure 9:
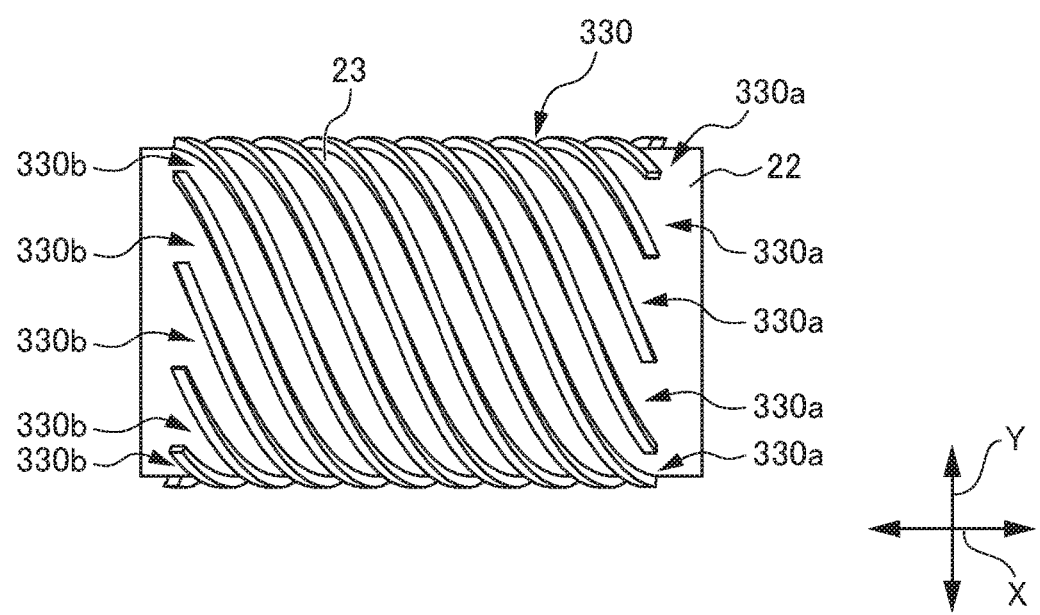
FIG. 9 is a conceptual view when the flow path 23 is formed with spiral grooves 330 of multiple threads.

Although in the embodiment, the case where the flow path 23 is formed with the spiral groove 230 of one thread is described, there is no limitation to this configuration. FIG. 9 is a conceptual view when the flow path 23 is formed with spiral grooves 330 of multiple threads. In FIG. 9, the tapered portion 232 and the like are omitted. As shown in FIG. 9, the spiral grooves 330 of multiple threads include a plurality of introduction portions 330a and a plurality of discharge portions 330b. The coolant introduced from the individual introduction portions 330a is circulated within the respective flow paths 23 spirally along the outer circumferential surface of the stator frame 22 and is thereafter discharged from the corresponding discharge portions 330b to the outside. As shown in FIG. 9, in the configuration in which the flow path 23 is formed with the spiral grooves 330 of multiple threads, the tapered portions 232 (unillustrated) provided on the one end side and the other end side in the axis direction communicate with the individual spiral grooves 330.

Figure 10A:
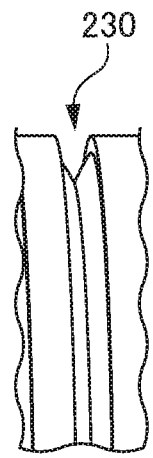
FIG. 10A is a partial side view showing an example where the spiral groove 230 has a groove shape of a triangle.
Figure 10B:
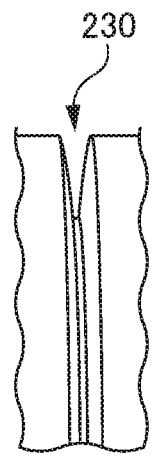
FIG. 10B is a partial side view showing an example where the spiral groove 230 has a groove shape of a trapezoid.
Figure 10C:
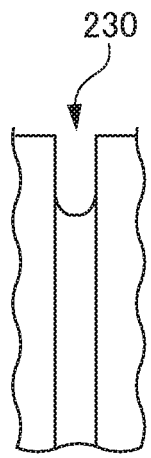
FIG. 10C is a partial side view showing an example where the spiral groove 230 has a groove shape of a semicircle.
Figure 10D:
FIG. 10D is a partial side view showing an example where the spiral groove 230 has a groove shape of a rectangle.

Although in the embodiment, the example is described where the spiral groove 230 of the flow path 23 has a groove shape of an approximate right triangle in which the inclined surface is formed on one side, there is no limitation to this configuration. FIGS. 10A to 10D are partial side views showing other examples of the groove shape in the spiral groove 230. The spiral groove 230 may have, for example, as shown in FIG. 10A, a groove shape of a triangle (the shape of a letter V) in which both sides are inclined surfaces or may have, as shown in FIG. 10B, a groove shape of a trapezoid in which both sides through a bottom side are inclined surfaces. The spiral groove 230 may have, for example, as shown in FIG. 10C, a groove shape of a semicircle (the shape of a letter U) or may have, as shown in FIG. 10D, a groove shape of a rectangle (concave shape). The spiral groove 230 is not limited to the examples described above, and as long as the coolant can be appropriately circulated, any groove shape may be adopted. The spiral groove 230 may have a groove shape obtained by combining different groove shapes.

Figure 11:
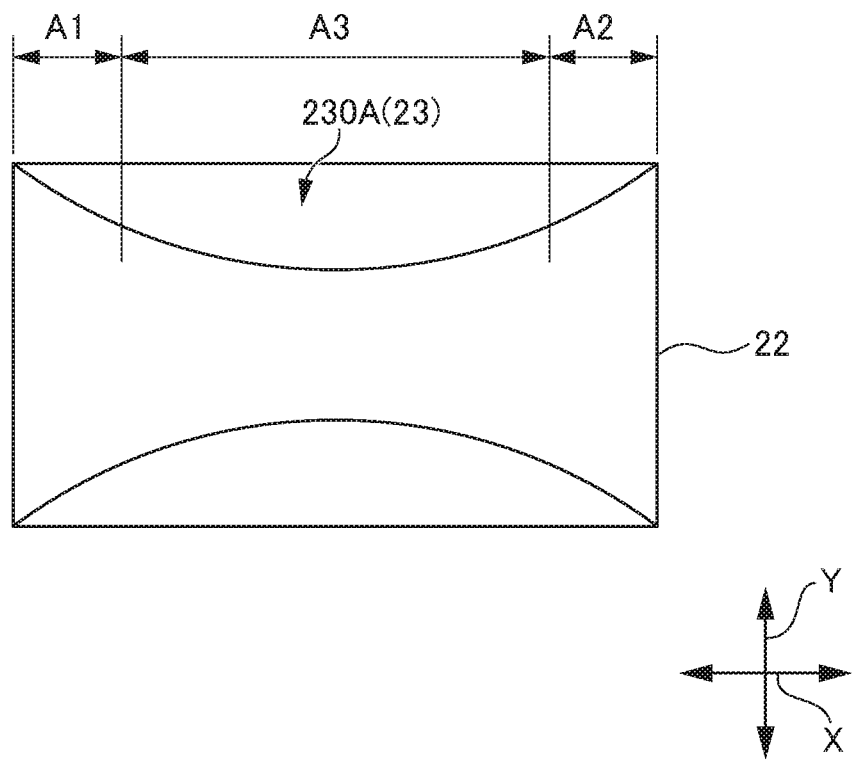
FIG. 11 is a conceptual view showing the distribution of groove depths of a spiral groove 230A formed in the outer circumferential surface of the stator frame 22.

Although in the embodiment, the example is described where the spiral groove 230 is formed such that as shown in FIG. 4, the groove depth is shallow in the region A1 on the one end side and the region A2 on the other end side in the axis direction (X direction) and that the groove depth is deep in the region A3 around the center in the axis direction, there is no limitation to this configuration. FIG. 11 is a conceptual view showing the distribution of groove depths of a spiral groove 230A formed in the outer circumferential surface of the stator frame 22.

The spiral groove 230A shown in FIG. 11 is formed such that the groove depth is gradually deeper in a curved shape from the region A1 on the one end side toward the region A3 around the center. Likewise, the spiral groove 230A is formed such that the groove depth is gradually deeper in a curved shape from the region A2 on the other end side toward the region A3 around the center. The region A3 around the center of the spiral groove 230A is formed such that the groove depth is gradually deeper in a curved shape and that the groove depth is deepest in the center portion. As with the spiral groove 230A, a configuration may be adopted in which the groove depth is changed in a curved shape in the entire region in the axis direction. Although in the embodiment, the example is described where the motor is used as the rotary electrical machine to which the stator frame and the stator according to the present invention can be applied, there is no limitation to this configuration. The rotary electrical machine may be a generator.

EXPLANATION OF REFERENCE NUMERALS

1: motor, 20: stator, 22: stator frame, 23: flow path, 30: rotor, 230: spiral groove, 231: groove projection, 232: tapered portion, 240: annular groove

What is claimed is:

1. A substantially cylindrical stator frame which has a function of cooling a stator in a rotary electrical machine, the stator frame comprising:
   a spiral groove which is provided as a flow path of a coolant from one end side to the other end side in an axis direction spirally along a circumferential direction of an outer circumferential surface; and
   annular grooves which individually communicate with end portions of the spiral groove on the one end side and the other end side in the axis direction and which are provided annularly along the circumferential direction of the outer circumferential surface,
   wherein the spiral groove is formed such that a groove depth is deep in a manner inclined toward a region around a center in the axis direction in regions on the one end side and the other end side in the axis direction such that a distance between a radially innermost surface of the spiral groove and a center axis of the stator frame decreases from the region on the one end side in the axis direction toward the region around the center in the axis direction and from the region on the other end side in the axis direction toward the region around the center in the axis direction.

2. The stator frame according to claim 1, wherein groove projections on outer sides of the spiral groove located at both end portions in the axis direction include tapered portions whose diameters are reduced toward the annular grooves.

3. The stator frame according to claim 1, wherein the spiral groove is a groove of one thread or a groove of multiple threads.

4. A stator comprising: the stator frame according to claim 1; and a substantially cylindrical iron core which is provided on an inner circumferential side of the stator frame.

5. A rotary electrical machine comprising: the stator according to claim 4; and
a rotor which is supported with a rotary axis and which is provided on an inner circumferential side of the stator.

\* \* \* \* \*